US008893665B2

(12) United States Patent
Surnilla et al.

(10) Patent No.: US 8,893,665 B2
(45) Date of Patent: Nov. 25, 2014

(54) METHOD AND SYSTEM FOR COMPENSATING FOR ALCOHOL CONCENTRATION IN FUEL

(75) Inventors: Gopichandra Surnilla, West Bloomfield, MI (US); Stephen B. Smith, Livonia, MI (US); Rohit Arvind Zope, Sugarland, TX (US); Brandon M. Dawson, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 590 days.

(21) Appl. No.: 13/211,822

(22) Filed: Aug. 17, 2011

(65) Prior Publication Data

US 2013/0042846 A1 Feb. 21, 2013

(51) Int. Cl.
*F02B 13/00* (2006.01)
*F02D 41/04* (2006.01)
*F02D 41/14* (2006.01)
*F02D 41/00* (2006.01)
*F02D 19/06* (2006.01)
*F02D 19/08* (2006.01)

(52) U.S. Cl.
CPC ............ *F02D 41/04* (2013.01); *F02D 19/0655* (2013.01); *F02D 19/084* (2013.01); *F02D 41/1454* (2013.01); *F02D 41/0025* (2013.01); *F02D 2200/0404* (2013.01); *F02D 2200/0612* (2013.01); *F02D 2200/0614* (2013.01); *F02D 2200/101* (2013.01)
USPC ........ 123/1 A; 123/406.31; 123/575; 701/103

(58) Field of Classification Search
CPC ... F02D 19/081; F02D 19/082; F02D 19/084; F02D 19/085; F02D 19/087; F02D 19/088; F02D 19/0607; F02D 19/061; F02D 19/0655; F02D 2200/0611; F02D 2200/0612; F02D 41/005; F02D 41/0052
USPC ............ 123/1 A, 406.31, 575–578, 672, 478; 701/103, 104, 105, 115
See application file for complete search history.

(56) References Cited

U.S. PATENT DOCUMENTS

| | | | | |
|---|---|---|---|---|
| 4,957,087 A | * | 9/1990 | Ota | 123/479 |
| 5,056,490 A | * | 10/1991 | Kashima | 123/478 |
| 5,183,021 A | * | 2/1993 | Suga et al. | 123/478 |
| 5,197,450 A | * | 3/1993 | Kitajima et al. | 123/685 |
| 5,881,703 A | * | 3/1999 | Nankee et al. | 123/686 |
| 6,055,963 A | * | 5/2000 | Brown et al. | 123/525 |
| 6,928,998 B2 | | 8/2005 | Abe | |
| 7,404,397 B2 | * | 7/2008 | Dobeck | 123/672 |
| 7,475,683 B2 | * | 1/2009 | Kokubu | 123/672 |
| 7,597,072 B2 | * | 10/2009 | Stein et al. | 123/90.15 |
| 7,621,257 B1 | * | 11/2009 | Leone et al. | 123/431 |
| 7,735,469 B2 | * | 6/2010 | Miyata et al. | 123/399 |
| 7,739,025 B2 | | 6/2010 | Kawakita et al. | |
| 7,768,382 B2 | * | 8/2010 | Cunningham et al. | 340/438 |
| 7,778,764 B2 | | 8/2010 | Ito et al. | |
| 7,826,957 B2 | * | 11/2010 | Fabien | 701/103 |

(Continued)

*Primary Examiner* — Thomas Moulis
(74) *Attorney, Agent, or Firm* — Julia Voutyras; Alleman Hall McCoy Russell & Tuttle LLP

(57) ABSTRACT

An engine system for determining an alcohol concentration in fuel is disclosed. In one example, engine throttle position, fuel pulse width, and air-fuel ratio form a basis for determining alcohol concentration of a fuel combusted in an engine. The system and its related method may improve engine operation in conjunction with detecting an alcohol concentration of a fuel.

20 Claims, 5 Drawing Sheets

(56) References Cited

U.S. PATENT DOCUMENTS

| | | | |
|---|---|---|---|
| 8,272,366 B2* | 9/2012 | Chiba | 123/435 |
| 8,544,449 B2* | 10/2013 | Yokura et al. | 123/468 |
| 8,639,431 B2* | 1/2014 | Jentz et al. | 701/103 |
| 2003/0075155 A1 | 4/2003 | Frech et al. | |
| 2009/0145382 A1* | 6/2009 | Kawai | 123/90.16 |
| 2010/0122695 A1 | 5/2010 | Kunisada et al. | |
| 2010/0236523 A1* | 9/2010 | Saruwatari et al. | 123/436 |
| 2011/0191006 A1* | 8/2011 | Nishida et al. | 701/103 |
| 2012/0234273 A1* | 9/2012 | Akihisa | 123/90.15 |

* cited by examiner

METHOD AND SYSTEM FOR COMPENSATING FOR ALCOHOL CONCENTRATION IN FUEL

BACKGROUND/SUMMARY

Engines may be configured to operate with fuels that can range from low concentrations of alcohol mixed with gasoline to fuels that have relatively high concentrations of alcohol mixed with gasoline. For example, a so called flexible fuel vehicle can operate with fuel comprised completely of gasoline or a fuel comprised of 85% ethanol and 15% gasoline. If the engine is controlled to operate substantially the same (e.g., with no difference in spark timing) and independent of the concentration of alcohol in the fuel, engine fuel economy may be reduced when fuels having higher alcohol concentrations are combusted. Therefore, it may be desirable to accurately determine a concentration of alcohol in fuel being combusted. One way of determining alcohol content in fuel is to place a sensor in the fuel so that alcohol may be detected in the fuel. However, alcohol sensors can add cost to a vehicle and they also increase engine system complexity.

The inventors herein have recognized the above-mentioned limitations and have developed a method for operating an engine, comprising: adjusting an engine actuator in response to an alcohol concentration of a fuel combusted by the engine, the alcohol concentration based on a position of a throttle, an output of an exhaust gas oxygen sensor, engine speed, and a fuel injector pulse width.

Alcohol concentration of a fuel may be determined without a dedicated fuel composition sensor. In one example, alcohol concentration of a fuel combusted in an engine can be determined via fuel pulse width, engine speed, engine air intake throttle position, and a lambda value from an exhaust gas oxygen sensor. Thus, alcohol concentration of a fuel may be determined via sensors commonly found in a fuel injected engine. In this way, engine system cost and complexity may be reduced for engines that combust a mixture of gasoline and alcohol.

The present description may provide several advantages. Specifically, the approach may provide an alcohol concentration of a fuel without a dedicated fuel composition sensor. Further, the approach may be useful for providing compensation for errors in the engine air intake system and the engine fuel system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
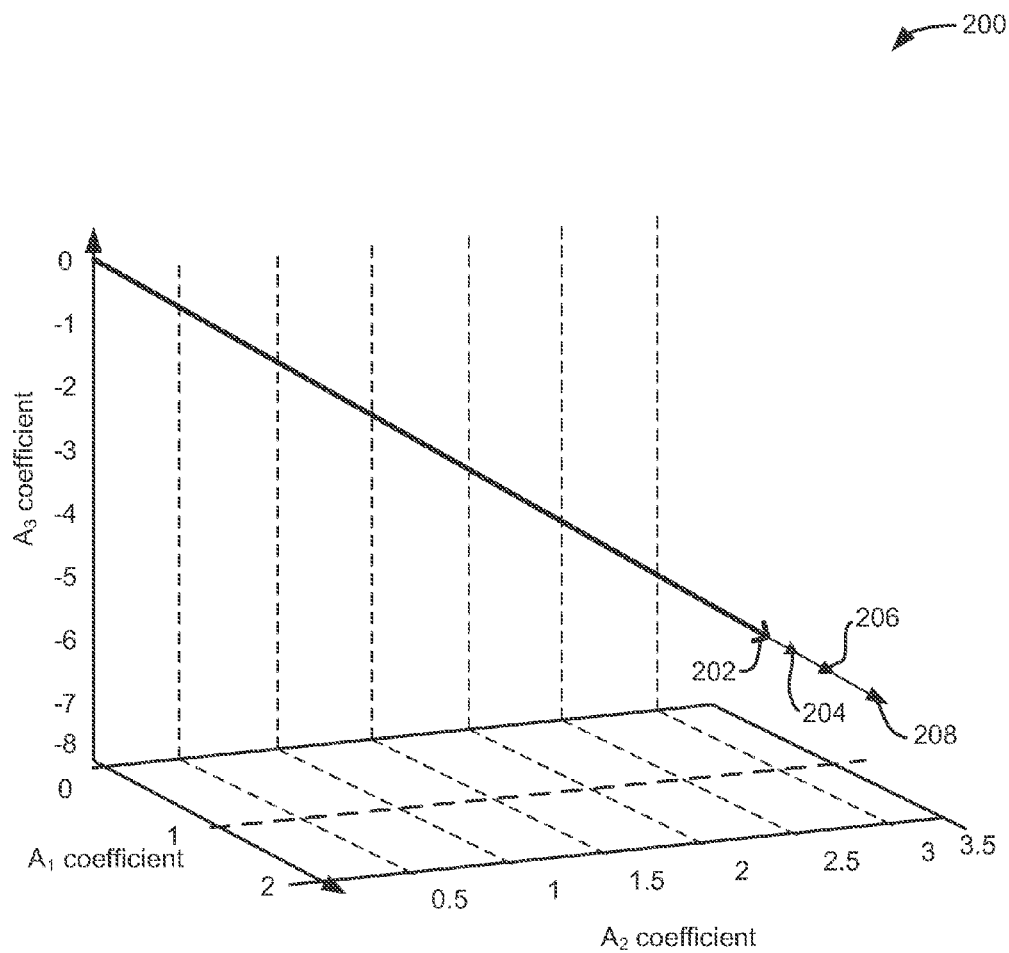
FIG. 2 shows a schematic depiction of vectors produced from combusting fuels with different alcohol concentrations.
Figure 3:
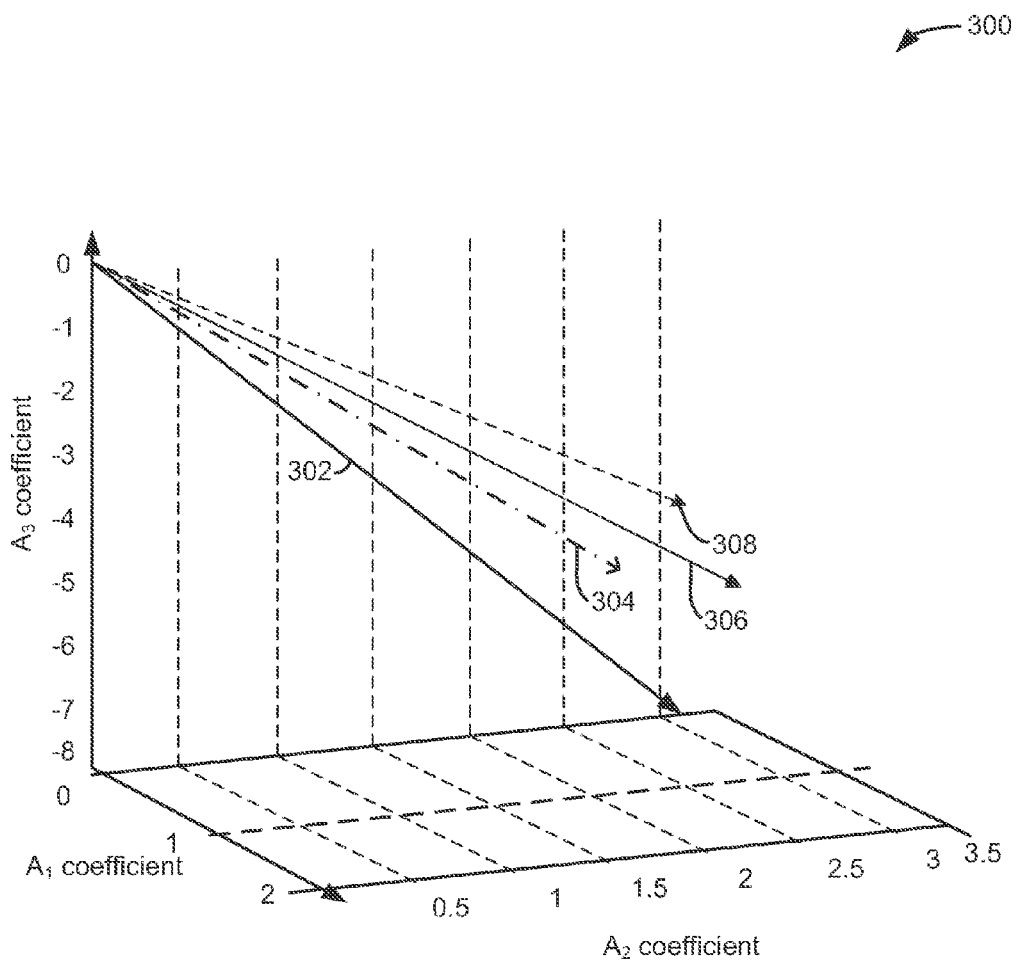
FIG. 3 shows a schematic depiction of vectors produced from combusting fuels with different alcohol concentrations and errors.
Figure 4:
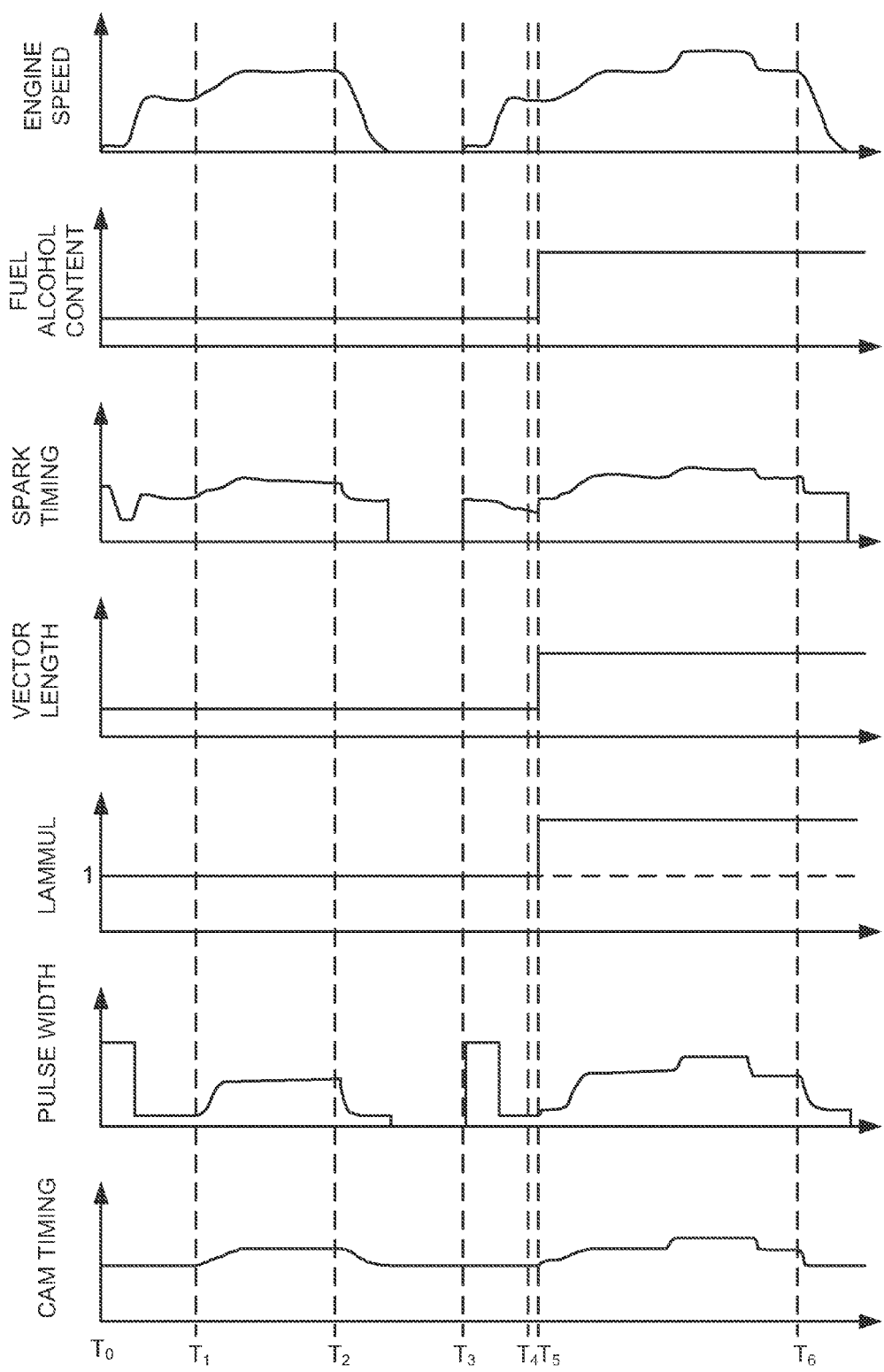
FIG. 4 shows a prophetic example of an engine operating sequence where a change in concentration of alcohol in fuel being combusted by an engine is detected and compensated.

The present description is related to controlling an engine that combusts fuels having different concentrations of alcohol. In one example, selected engine operating parameters including fuel pulse width, engine speed, engine lambda, and engine air intake throttle position are part of a regression for determining vectors, as shown in FIGS. 2 and 3. The vectors are determined and processed as described in the method of FIG. 5 for operating an engine as shown in the sequence of FIG. 4.

Figure 1:
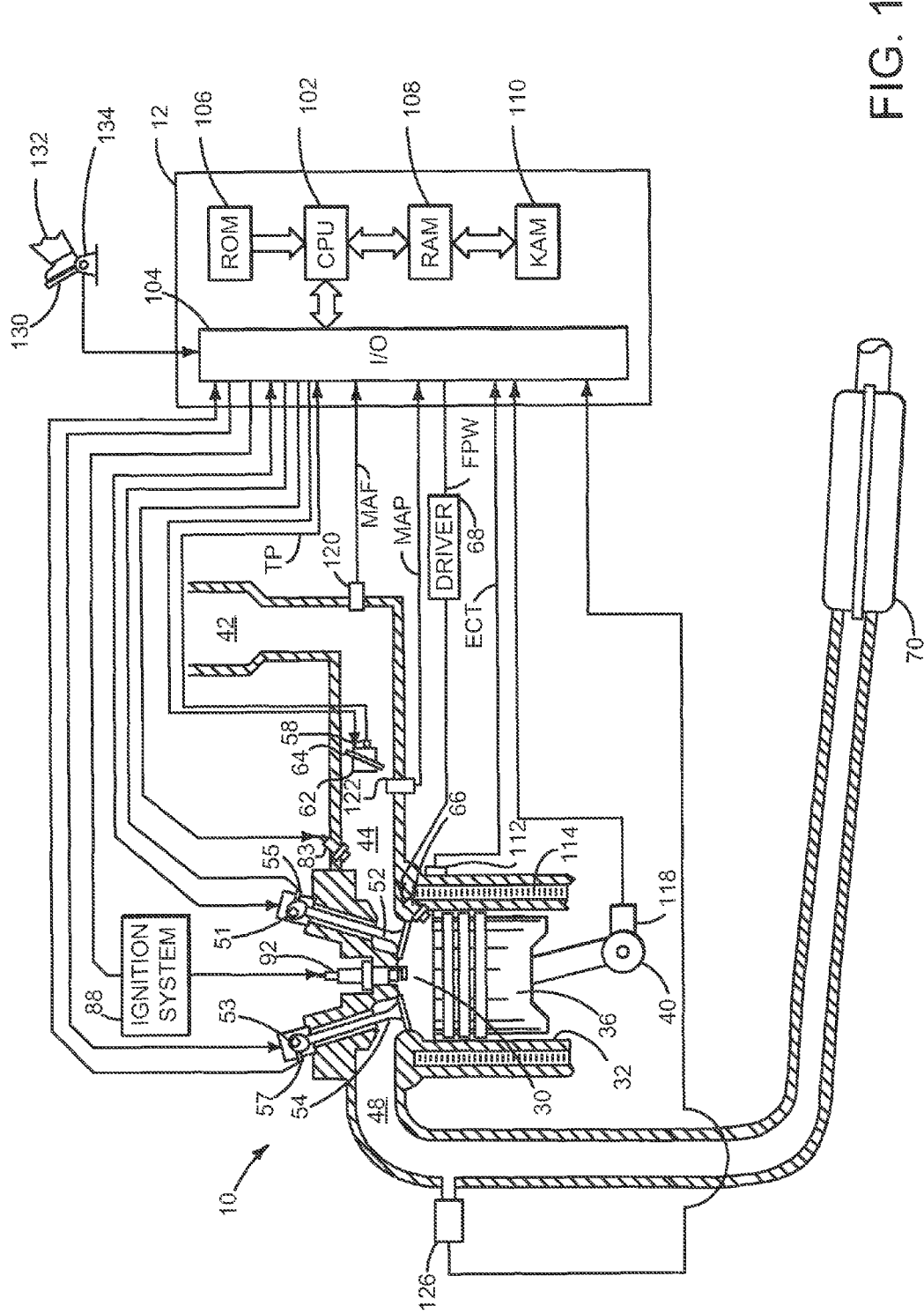
FIG. 1 shows a schematic depiction of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In some examples, fuel may be injected via a second port fuel injector 83. In addition, intake manifold 44 is shown communicating with optional electronic throttle 62 which adjusts a position of throttle plate 64 to control air flow from engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine system, comprising: an engine; a first actuator coupled to the engine; a second actuator coupled to the engine; an exhaust gas oxygen sensor located in an exhaust passage of the engine; and a controller including instructions to adjust the first or second actuator in response to an alcohol concentration of a fuel combusted by the engine in response to the first actuator, the exhaust gas oxygen sensor, an a speed of the engine. In this way, a vector can be constructed from which alcohol concentration of a fuel may be determined. The engine system includes where the first actuator is an air intake throttle, and where the second actuator is a fuel injector. The engine system also includes where first actuator is an air intake throttle, and where the second actuator is an ignition system. In another example, the engine system includes where the second actuator is adjusted in response to a position of the first actuator, and where the first actuator an engine air intake throttle, and where the second actuator is a fuel injector. The engine system also includes where the controller includes further instructions for regressing a plurality of coefficients from a plurality of parameters to determine alcohol concentration of a fuel being combusted in the engine. The engine system includes where the controller includes further instructions for reducing error in an engine air flow mass or fuel flow mass based on the plurality of coefficients.

Referring now to FIG. 2, a schematic depiction of prophetic vectors produced from data collected via a controller monitoring an engine combusting fuels with different mixtures of alcohol and gasoline is shown.

Vectors 202-208 represent vectors formed from coefficients regressed from engine data. The coefficients are described in greater detail as is the model from which the coefficients are determined. The vertical axis represents an $A_3$ coefficient. The X axis represents an $A_2$ coefficient. Finally, the Z axis represents the $A_1$ axis. The length of each vector 202-208 is representative of an alcohol concentration of fuel being combusted by an engine.

The length of a vector increases for fuels combusted that have higher concentrations of alcohol. In particular, at a constant engine speed and engine air amount, the fuel injection pulse width increases in order to combust a fuel having increased alcohol concentration at a stoichiometric air-fuel mixture because fuels having higher concentrations of alcohol have a lower stoichiometric air-fuel ratios than fuels having higher concentrations of gasoline. Thus, the increasing fuel pulse width increases the vector length.

In the present example, vector 202 represents E0 (e.g., gasoline only), vector 204 represents E30 (e.g., 30% ethanol and 70% gasoline), vector 206 represents E60 (e.g., 60% ethanol and 40% gasoline), and vector 208 represents E85 (e.g., 85% ethanol and 15% gasoline). Notice that vector 202 is the shortest vector followed in length by vector 204. Vector 206 is still longer than vector 204 and vector 208 is longer than vector 206. Thus, it can be seen that the E85 vector (e.g., 208) is longer than each of the other vectors. As a result, a length of a vector is indicative of the alcohol concentration of the fuel being combusted. In this example, there are no errors or equivalent errors in the fuel pulse width, the throttle position, engine speed, and lambda for each of the fuels shown. Therefore, the vectors overlap and no angles are formed between the vectors.

Figure 5:
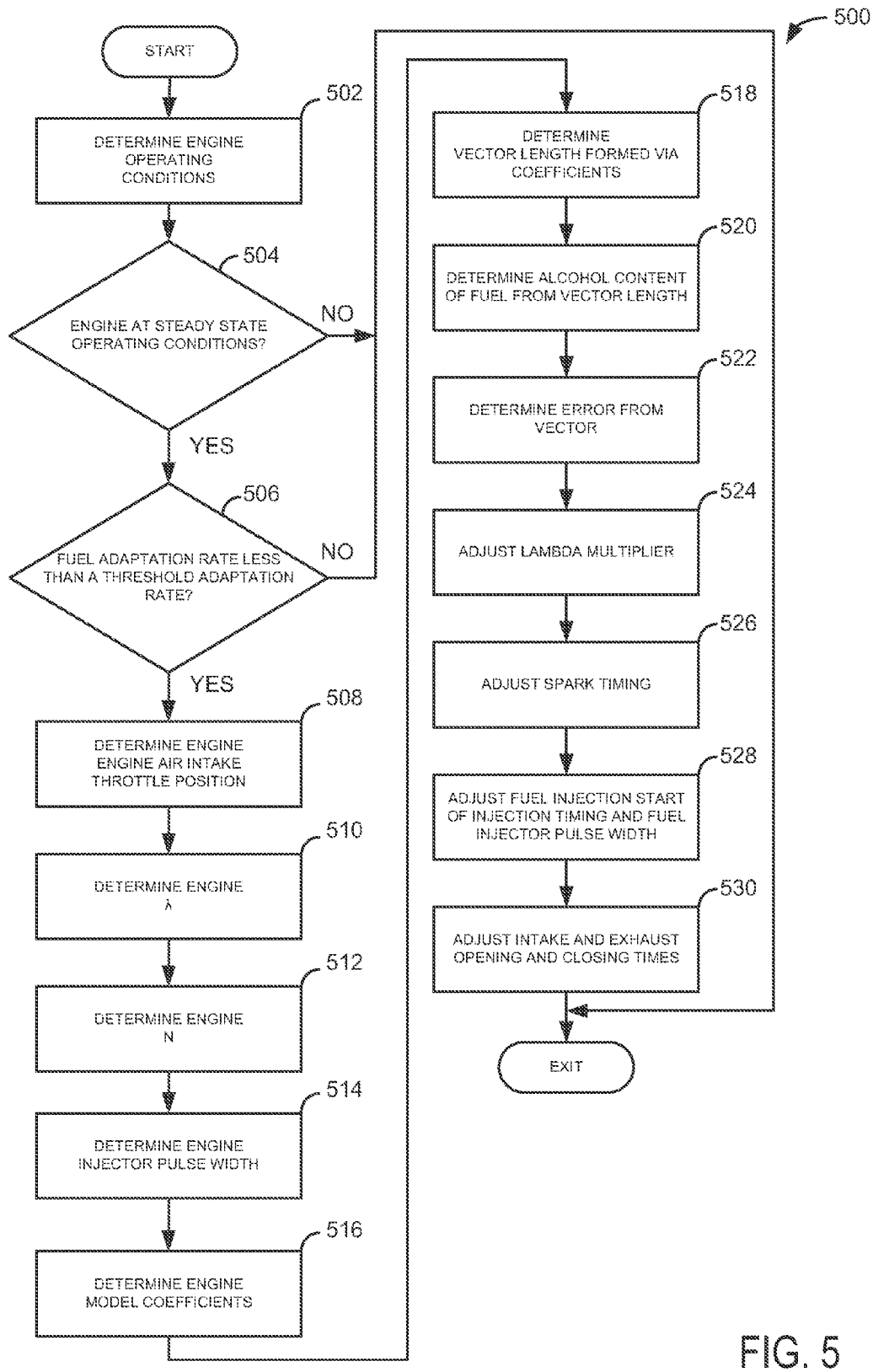
FIG. 5 shows a flowchart of an example method for operating an engine.

In some examples discussed with regard to the method of FIG. 5, engine actuators may be adjusted according to the alcohol concentration which is related to the vector length. For example, if alcohol concentration of an injected fuel increases, spark advance may be increased so as to take advantage of lower engine knock susceptibility of higher concentration alcohol fuels.

Referring now to FIG. 3, a schematic depiction of prophetic vectors with errors produced from data collected via a controller monitoring an engine combusting fuels with different mixtures of alcohol and gasoline is shown. The axis configuration and plotting of FIG. 3 is the same as FIG. 2.

In the example of FIG. 3, vectors 302-208 represent vectors formed from coefficients regressed from engine data similar to FIG. 2. Similar to FIG. 2, the length of each vector increases for fuels combusting higher concentrations of alcohol. However, in this example, the angle of the vectors with respect to the X, Y, and Z axis provides an indication of engine air and fuel estimation errors. For example, if an amount of air is desired for stoichiometric combustion of an air-fuel mixture, and the throttle is more or less open than expected, the vector angle changes. The angular relationship between the vector describing present fuel conditions (e.g., 302 E85) and the X, Y, and Z axis provides an indication of the error.

In the present example, vectors 302, 304, 306, and 308 represent combustion of different fuels were errors in throttle position, fuel pulse width, engine speed, or engine lambda result in angular separation between vectors. Thus, when there are different angles between vectors, it may be determined that there are errors in throttle position, fuel pulse width, engine speed, or engine lambda. In some examples control actions or diagnostics may be taken in response to a change in vector angle. For example, if throttle position changes unexpectedly by a small amount, it may be determined from a change in vector angle that a throttle position sensor has degraded even though the vector length is within an expected range for E0 to E85 fuels. Thus, errors in throttle position, lambda, engine speed, and fuel pulse width may be determined and compensated.

Referring now to FIG. 4, a prophetic engine operating sequence is shown where a concentration of alcohol in a combusted fuel increases during the sequence. The sequence of FIG. 4 may be provided via an engine and controller as shown in FIG. 1 executing instructions of the method shown in FIG. 5. Vertical markers $T_0$-$T_5$ represent times of particular interest in the sequence.

The first plot from the top of FIG. 4 represents engine speed versus time. The Y axis represents engine speed and engine speed increase in the direction of the Y axis arrow. The X axis represents time and time increase in a direction of the X axis arrow.

The second plot from the top of FIG. 4 represents alcohol content in fuel combusted by an engine versus time. The Y axis represents alcohol in fuel combusted by the engine and the alcohol concentration of the fuel increases in the direction of the Y axis arrow. The X axis represents time and time increase in a direction of the X axis arrow.

The third plot from the top of FIG. 4 represents engine spark timing versus time. The Y axis represents engine spark timing advance and engine spark timing advances further in the direction of the Y axis arrow. The X axis represents time and time increase in a direction of the X axis arrow.

The fourth plot from the top of FIG. 4 represents coefficient vector length versus time (e.g., see FIG. 2 for a vector representation). The Y axis represents coefficient vector length and coefficient vector length increases in the direction of the Y axis arrow. The X axis represents time and time increase in a direction of the X axis arrow.

The fifth plot from the top of FIG. 4 represents a lamda fuel multiplier that accounts for changes in fuel compensation for an engine combusting an air-fuel mixture. The Y axis represents the magnitude of the lambda fuel multiplier and the lambda fuel multiplier increases in the direction of the Y axis arrow. The X axis represents time and time increase in a direction of the X axis arrow.

The sixth plot from the top of FIG. 4 represents fuel injector pulse width versus time. The Y axis represents fuel injector pulse width and fuel injector pulse width increases in the direction of the Y axis arrow. The X axis represents time and time increase in a direction of the X axis arrow.

The seventh plot from the top of FIG. 4 represents engine cam advance versus time. The Y axis represents engine cam advance and engine cam advance increase in the direction of the Y axis arrow. In this example, cylinder air charge increases as the engine camshaft is advanced. The X axis represents time and time increase in a direction of the X axis arrow.

At time $T_0$, the engine is cranked from stop and started. The alcohol content of the fuel being combusted is relatively low and the vector length that corresponds to the alcohol content is also low as is the fuel multiplier which is at a value of one. The cam timing is set to a mid position and the fuel pulse width is at a higher level since the cylinder air charge is high during engine cranking.

After time $T_0$ and before time $T_1$, the engine starts and engine speed increases. Spark timing is retarded to improve engine heating and the fuel pulse width is decreased to reflect the lower cylinder air charge. Cam timing is steady during the engine run-up and during the idle period where engine speed is relatively constant.

At time $T_1$, engine speed increases in response to an operator request to accelerate the vehicle which the engine powers. The content of alcohol in the engine fuel remains constant as does the coefficient vector length and the lambda fuel multiplier. The fuel injector pulse width also increases to supply additional fuel to accelerate the vehicle and provide a stoichiometric air-fuel mixture. The cam timing and spark are also advanced as engine speed and load are increased to meet the operator demand.

At time $T_2$, engine speed decreases in response to an operator request to decelerate the vehicle. The content of alcohol in the engine fuel remains constant as does the coefficient vector length and the lambda fuel multiplier. Spark timing and cam timing are retarded as the operator torque request decreases to decelerate the vehicle.

Between time $T_2$ and $T_3$ the engine is stopped and the vehicle is refueled with a fuel comprising a higher concentration of alcohol. Since it takes time to displace the previous fuel from the fuel lines the alcohol content in the fuel remains the same as does the coefficient vector length and the lambda fuel multiplier.

At time $T_3$, the engine is restarted and fuel in the fuel lines starts to be consumed by the engine. The engine spark timing is advanced based on the composition of the fuel that was in the vehicle prior to the refueling event. Similarly, the fuel injector pulse width at starting is reflective of combusting the fuel in the vehicle before the refueling event. Cam timing is also shown as the same as in the original engine start since the original fuel has not been displaced from the fuel lines at time of starting.

Between time $T_3$ and time $T_4$, the engine speed increases and the vehicle speed stabilizes at idle speed. During the idle and run-up the fuel lines are purged of the original fuel and replaced with a combination of a mixture of the remaining fuel before the refill and the fuel supplied to the fuel tank during the fuel refill. The amount of fuel delivered during the time the fuel lines are purged may be adapted via increasing or decreasing the fuel pulse width based on oxygen sensor feedback. In particular, if the output of the exhaust gas oxygen sensor begins to trend lean, the fuel injector pulse width is increased so as to drive the oxygen sensor back to read stoichiometric conditions.

At time $T_4$, the engine reaches stable operating conditions where fuel consumed by the engine can be evaluated for alcohol content. In some examples, selected thresholds of maximum rates of change in engine speed and engine load as well as rate of fuel adaptation are conditions for determining alcohol content of fuel. Specifically, engine speed and engine load are required to change less than some maximum amount otherwise the alcohol content is not evaluated. In other examples, alcohol content may be evaluated with fewer or no preconditions.

Between time $T_4$ and $T_5$, an engine controller monitors engine speed, engine air intake throttle position, fuel injector pulse width, and engine lambda as measured from engine exhaust gases via an oxygen sensor. Further, coefficients for a model describing a relationship between fuel combusted and engine lambda are determined according to the method of FIG. 5 described below. The coefficients are combined to provide a vector and the length of the vector is compared against predetermined values stored in a table or function that describe the concentration of alcohol in the fuel being combusted. In this way, the concentration of alcohol in fuel may be determined.

At time $T_5$, the alcohol in fuel concentration is updated based on coefficients from the fuel model. In particular, the alcohol content in the fuel being combusted increases as the vector length is determined. In this example, the vector length increases and indicates that the concentration of alcohol in the fuel has increased. The lambda multiplier LAMMUL is also updated so as to increase the fuel injector pulse width shown in the sixth plot from the top of FIG. 4. The cam timing is also advanced so as to increase the cylinder air charge. The spark timing is also advanced to take advantage of the knock suppression characteristics of the additional alcohol in the fuel.

Between time $T_5$ and $T_6$, spark timing is advanced as is cam timing to account for the increased alcohol content of the fuel being combusted. The alcohol content in the fuel remains at the level indicated from the increased coefficient vector length. The lambda fuel multiplier also stays at a higher level so that the fuel injection pulse width is increased as compared to the fuel injection pulse width when fuel with a lower alcohol concentration is combusted.

At time $T_6$, the operator decreases a torque request so that the vehicle will slow down. As a result, engine speed decreases along with fuel pulse width. Cam timing is also retarded. The engine is stopped shortly after time $T_6$.

Referring now to FIG. 5, a flowchart of an example method for operating an engine is shown. The method of FIG. 5 is executable via instructions of controller 12 in the system shown in FIG. 1. The method of FIG. 5 may also provide the sequence illustrated in FIG. 4.

At 502, method 500 determines engine operating conditions. Engine conditions may include but are not limited to throttle position, engine speed, engine load, engine temperature, fuel pulse width, throttle position, engine torque demand, and vehicle speed. Method 500 proceeds to 504 after engine operating conditions are determined.

At 504, method 500 judges whether or not the engine is at steady state operating conditions. In one example, method 500 judges the engine to be at steady state operating conditions when engine speed change is less than a threshold amount and when engine torque demand changes by less than a threshold amount. In some examples, engine speed and load may be restricted to within a prescribed range of engine speed and load. If engine operating conditions are not at steady state conditions, method 500 proceeds to exit. Otherwise, method 500 proceeds to 506.

At 506, method 500 judges whether or not a fuel adaptation rate is less than a threshold rate. Specifically, method 500 monitors a rate of change in a fuel adaptation parameter. If the fuel adaptation parameter is changing by more than a predetermined amount, method 500 determines that the fuel pulse width is changing at a high rate and exits to allow additional fuel adaptation before determining the alcohol content in the fuel. Otherwise, method 500 proceeds to 508.

It should be noted that in some examples, additional or fewer conditions may need to be met before alcohol content in fuel is determined. For example, 504 may be eliminated in some examples so that alcohol concentration may be determined during more transient conditions.

Returning now to FIG. 5, engine air intake throttle position (e.g., 64 of FIG. 1) is determined at 508. Throttle position may be determined via throttle position sensor 58 of FIG. 1. In some examples, throttle position may be filtered so as to reduce high frequency components of the throttle position. Method 500 proceeds to 510 after engine throttle position is determined.

At 510, engine lambda (λ) is determined. Engine lambda may be determined via an output of a linear oxygen sensor (e.g., 126 of FIG. 1). Lambda may be described by the following equation:

$$\text{Lambda}(\lambda) = \frac{\text{air/fuel}}{\text{air/}fuel_{stoic}}$$

Where air is a cylinder air charge mass, fuel is a cylinder fuel charge mass, and where the subscript stoic indicates the cylinder air-fuel ratio at stoichiometric conditions. Method 500 proceeds to 512 after engine lambda is determined.

At 512, method 500 determines engine speed. Engine speed may be determined from an engine crankshaft position sensor (e.g., 118 of FIG. 1). Method 500 proceeds to 514 after engine speed is determined.

At 514, method 500 determines fuel injector pulse width. The fuel injector pulse width may be determined via an inquiry to a register that holds injector timing information. The fuel injector pulse width may be in units of time or counts that are related to clock ticks. Method 500 proceeds to 516 after fuel injector pulse width is determined.

At 516, method 500 determines engine fuel model coefficients. In one example, the engine fuel model is of the form:

$$\text{Fuel\_pw} = a_1 \cdot (TP^2) + a_2 \cdot \left(\frac{TP^2}{N}\right) + a_3 \cdot \left(\frac{1}{\lambda}\right)$$

Where Fuel_pw is fuel pulse width, TP is throttle position, N is engine speed, λ is engine lambda, and $a_1$-$a_3$ are polynomial coefficients. In one example, coefficients $a_1$-$a_3$ may be determined via regression (e.g., least squares). Method 500 proceeds to 518 after model coefficients are determined.

At 518, method 500 provides a vector defined by the model coefficients from 516. For example, as shown in FIG. 2 the coefficient vectors extend from the origin according to the numerical values of coefficients $a_1$-$a_3$. The length of the vector is determined by squaring each of the coefficients, adding the squared coefficients, and taking the square root of the sum. Method 500 proceeds to 520 after the length of the vector is determined.

At 520, the alcohol content of the fuel is determined based on the length of the vector. In one example, vector lengths are related to alcohol content of a fuel though empirical testing and stored in controller memory. When a length of a new vector is determined, it may be compared to a length of an empirically determined vector that is related to a concentration of alcohol in fuel. For example, if a new vector is determined to have a length of 55, it can be compared to vectors stored in memory having a length of 55. The alcohol concentration of the vector having a length of 55 is then assigned to the fuel being presently combusted. In this way, a vector length determined from coefficients related to combusting a fuel can be compared to existing empirically determined vector lengths associated with fuels having known concentrations of alcohol to determine the alcohol concentration of the combusted fuel. Method 500 proceeds to 522 after the concentration of alcohol in the fuel being combusted is determined.

At 522, method 500 determines errors from the coefficient vector of the newly combusted fuel. In some examples, the error may be attributed to fuel pulse width, throttle position, engine speed, or engine lambda. For example, if the $a_2$ coefficient of a vector changes length due to an error in engine speed, a difference in the angle between the plane formed by the $a_3$ and $a_1$ axis and the vector may result. Similarly, if a vector changes because of a change in the $a_1$ or $a_3$ coefficients, an error may be indicated and compensated. For example, if a vector angle changes indicating a fuel pulse width error, a fuel injector diagnostic may be performed and an offset error in the injector may be obviated by increasing a base injection amount. Similarly, an error in throttle position may be related to an error in estimated air mass and the error may be reduced by adding an offset or adjusting a transfer function of an air meter. Method 500 proceeds to 524 after determining the fueling and air charge errors.

At 524, method 500 adjusts a lambda multiplier based on the alcohol concentration in the fuel being combusted. In one example, the lambda multiplier is adjusted from 1 for gasoline to 1.48 for E85. The adjustment to the Lambda multiplier may be extracted from a table that relates a lambda adjustment amount to an alcohol concentration of a fuel. The lambda multiplier is a multiplier that modifies a base fuel amount to account for fuel variations and fuel system variations (e.g., differences between a commanded and actual injector output). Method 500 proceeds to 526 after the lambda multiplier is adjusted to account for any change in alcohol concentration of a fuel being combusted.

At 526, method 526 adjusts spark timing to account for changes in concentration of alcohol content of a fuel being combusted. In one example, a plurality of spark maps are stored in memory and engine spark is determined from one or more spark maps based on engine speed, engine load, and fuel alcohol concentration. Each of the plurality of spark maps is based on an alcohol concentration in the fuel being combusted. Therefore, once the alcohol concentration of the fuel is determined, the appropriate spark map can be selected and spark can be delivered to the engine based on the selected spark map. Method 500 proceeds to 528 after spark timing is adjusted.

At 528, method 500 adjusts fuel injection timing. In some examples, start of injection timing is adjusted in response to a change in alcohol concentration of a fuel being combusted. For example, if a concentration of alcohol in a fuel being combusted increases by 10%, fuel injection timing may be advanced by 2 crankshaft degrees. In addition, a change in the duration of the fuel pulse width may be provided so that stoichiometric combustion may be achieved when a change in alcohol concentration of a fuel being combusted changes. In one example where the concentration of alcohol in a fuel being combusted increases, the fuel injection pulse width is increased so as to provide a stoichiometric air-fuel mixture. In an example where the concentration of alcohol in the fuel being combusted decreases, the fuel injection pulse width may be decreased. Method 500 proceeds to 530 after fuel injection timing is adjusted.

At 530, intake and exhaust valve timing are adjusted in response to a change in alcohol concentration of a fuel being combusted. In one example, where a concentration of alcohol increases in a fuel being combusted, cam timing is advances. Empirically determined cam timings for different engine speeds, loads, and fuel alcohol concentrations may be stored in memory and retrieved based on engine operating conditions. By advancing cam timing, a cylinder may be able to trap additional air for combustion, thereby effectively raising a compression ratio of a cylinder. Method 400 proceeds to exit after intake and exhaust valve timing is adjusted.

In this way, adjustments may be made to the engine based on an alcohol concentration in fuel. Further, the alcohol concentration in the fuel may be determined via a system and method that negates the need for a dedicated fuel sensor. Thus, a cost effective and simplified way of determining an alcohol concentration in a fuel being combusted may be provided.

Thus, the method of FIG. 5 provides for operating an engine, comprising: adjusting an engine actuator in response to an alcohol concentration of a fuel combusted by the engine, the alcohol concentration based at least on a position of a throttle, an output of an exhaust gas oxygen sensor, engine speed, and a fuel injector pulse width. Consequently, the method of FIG. 5 can adjust engine operation in response to engine inputs that may be related to fuel composition.

In some examples, the method includes where the engine actuator is a fuel injector or a camshaft phase actuator or an ignition system, and where the alcohol concentration is further based on a fuel injector pulse width. The method further comprises advancing a timing of a camshaft in response to an increase in alcohol concentration of engine torque. In one example, the method further comprises determining a plurality of coefficients from the position of the throttle, the output of the exhaust gas oxygen sensor, engine speed, and a fuel pulse width. The method also includes where the alcohol concentration is determined from the plurality of coefficients. The method further comprises providing a vector from the plurality of coefficients, and where the alcohol concentration is based on a length of the vector. The method further comprises providing an air or fuel error from the vector and providing compensation for the air or fuel error. The method also includes where the fuel combusted in the engine is delivered from a port fuel injector and a direct fuel injector.

In another example, the method of FIG. 5 provides for operating an engine, comprising: operating an engine during conditions where engine speed and load are varying by less than predetermined amounts; adjusting fuel adaptation by less than a threshold amount; and adjusting an engine actuator in response to an alcohol concentration of a fuel combusted by the engine, the alcohol concentration based on a position of a throttle, an output of an exhaust gas oxygen sensor, engine speed, and a fuel pulse width. In this way, the concentration of alcohol in fuel may be determined during conditions where accuracy of the estimate may be improved.

In some examples, the method includes where the fuel is comprised of gasoline and alcohol, and where the gasoline and alcohol are separately injected to the engine. The method also includes where the engine actuator is a fuel injector and further adjusting spark timing and opening and closing timing of an intake valve in response to the alcohol concentration. The method includes where the alcohol concentration is determined from a regression. In another example, the method includes where a plurality of coefficients is determined from the regression, and where a vector is determined from the plurality of coefficients. The method also includes where the alcohol concentration is based on a length of the vector.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine system, comprising:
   an engine;
   a first actuator coupled to the engine;
   a second actuator coupled to the engine;
   an exhaust gas oxygen sensor located in an exhaust passage of the engine; and
   a controller including instructions to adjust the first or second actuator in response to an alcohol concentration of a fuel combusted by the engine, the alcohol concentration based on the first actuator, the exhaust gas oxygen sensor, and a speed of the engine.

2. The engine system of claim 1, where the first actuator is an air intake throttle, and where the second actuator is a fuel injector.

3. The engine system of claim 1, where the first actuator is an air intake throttle, and where the second actuator is an ignition system.

4. The engine system of claim 1, where the second actuator is adjusted in response to a position of the first actuator, and where the first actuator is an engine air intake throttle, and where the second actuator is a fuel injector.

5. The engine system of claim 1, where the controller includes further instructions for regressing a plurality of coefficients from a plurality of parameters to determine the alcohol concentration of the fuel being combusted in the engine.

6. The engine system of claim 5, where the controller includes further instructions for reducing error in an engine air flow mass or fuel flow mass based on the plurality of coefficients.

7. A method for operating an engine, comprising:
   adjusting an engine actuator in response to an alcohol concentration of a fuel combusted by the engine, the alcohol concentration based at least on a position of a throttle, an output of an exhaust gas oxygen sensor, engine speed, and a fuel injector pulse width.

8. The method of claim 7, where the engine actuator is a fuel injector or a camshaft phase actuator or an ignition system, and where the alcohol concentration is further based on a fuel injector pulse width.

9. The method of claim 8, further comprising advancing a timing of a camshaft in response to an increase in alcohol concentration of engine torque.

10. The method of claim 8, further comprising determining a plurality of coefficients from the position of the throttle, the output of the exhaust gas oxygen sensor, engine speed, and a fuel pulse width.

11. The method of claim 10, where the alcohol concentration is determined from the plurality of coefficients.

12. The method of claim 11, further comprising providing a vector from the plurality of coefficients, and where the alcohol concentration is based on a length of the vector.

13. The method of claim 12, further comprising providing an air or fuel error from the vector and providing compensation for the air or fuel error.

14. The method of claim 7, where the fuel combusted in the engine is delivered from a port fuel injector and a direct fuel injector.

15. A method for operating an engine, comprising:
   operating an engine during conditions where engine speed and load are varying by less than predetermined amounts;
   adjusting fuel adaptation by less than a threshold amount; and
   adjusting an engine actuator in response to an alcohol concentration of a fuel combusted by the engine, the alcohol concentration based on a position of a throttle, an output of an exhaust gas oxygen sensor, engine speed, and a fuel pulse width.

16. The method of claim 15, where the fuel is comprised of gasoline and alcohol.

17. The method of claim 15, where the engine actuator is a fuel injector and further adjusting spark timing and opening and closing timing of an intake valve in response to the alcohol concentration.

18. The method of claim 15, where the alcohol concentration is determined from a regression.

19. The method of claim 18, where a plurality of coefficients is determined from the regression, and where a vector is determined from the plurality of coefficients.

20. The method of claim 19, where the alcohol concentration is based on a length of the vector.

* * * * *